United States Patent
Herrero et al.

(10) Patent No.: US 11,469,893 B2
(45) Date of Patent: Oct. 11, 2022

(54) SYSTEMS AND METHODS FOR ESTABLISHING SECURED CONNECTIONS FOR IOT DEVICES

(71) Applicant: SENSORMATIC ELECTRONICS, LLC, Boca Raton, FL (US)

(72) Inventors: Rolando Herrero, Amherst, NH (US); Jerry Xiaowen Wu, Westford, MA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 127 days.

(21) Appl. No.: 16/692,813

(22) Filed: Nov. 22, 2019

(65) Prior Publication Data

US 2021/0160070 A1 May 27, 2021

(51) Int. Cl.
*H04L 29/06* (2006.01)
*H04L 9/32* (2006.01)
*H04L 9/40* (2022.01)
*H04L 9/08* (2006.01)

(52) U.S. Cl.
CPC .......... *H04L 9/3213* (2013.01); *H04L 9/0869* (2013.01); *H04L 9/3263* (2013.01); *H04L 63/0435* (2013.01); *H04L 63/123* (2013.01); *H04L 63/166* (2013.01)

(58) Field of Classification Search
CPC ... H04L 9/3213; H04L 9/3263; H04L 63/166; H04L 63/123; H04L 63/0435; H04L 9/2869
See application file for complete search history.

(56) References Cited

U.S. PATENT DOCUMENTS

| | | | | |
|---|---|---|---|---|
| 6,219,793 | B1* | 4/2001 | Li | G07C 9/37 726/19 |
| 9,847,977 | B2* | 12/2017 | Freeman | H04L 63/126 |
| 11,336,658 | B2* | 5/2022 | Teshome | H04L 41/0659 |
| 2001/0044897 | A1* | 11/2001 | Ishiguro | H04L 12/40104 713/171 |
| 2003/0110374 | A1* | 6/2003 | Yamamoto | G06Q 20/3674 713/155 |
| 2003/0202661 | A1* | 10/2003 | Rodriguez | H04N 21/63345 380/239 |
| 2009/0006851 | A1* | 1/2009 | Freeman | H04L 63/126 713/170 |
| 2020/0267127 | A1* | 8/2020 | Mitra | H04L 9/0819 |
| 2021/0264015 | A1* | 8/2021 | Akinaga | G06Q 50/10 |

\* cited by examiner

*Primary Examiner* — Shawnchoy Rahman
(74) *Attorney, Agent, or Firm* — ArentFox Schiff LLP (57) ABSTRACT

Aspects of the present disclosure include methods, systems, and non-transitory computer readable media that perform the steps of transmitting a token to a gateway, receiving a response token including an encrypted message, decrypting the encrypted message using a decryption key associated with the token to generate a decrypted message, validating content of the decrypted message, transmitting a certificate request in response to successfully validating the content of the decrypted message, receiving a certificate in response to the request, validating the certificate against a certification authority, and transmitting encrypted data via a secured connection in response to successfully validating the certificate.

17 Claims, 7 Drawing Sheets

SYSTEMS AND METHODS FOR ESTABLISHING SECURED CONNECTIONS FOR IOT DEVICES

BACKGROUND

Internet of Things (IoT) may refer to a system of interconnected electronic devices. Each device may include a unique identifier to distinguish one device from another. In an IoT system, devices may transmit and/or receive data to/from each other without human input. The IoT system may include sensors, actuators, analytical systems, artificial intelligence systems, control systems, automation, and/or embedded systems. An example of the IoT system may include a "smart home," where a home owner may receive sensor data (e.g., temperature, security entry, utility usage, etc.) and/or transmit control signals to appliances (e.g., activating air conditioning unit, disabling security alarm, etc.).

In order to prevent unwanted devices from participating in an IoT system, secured connections may be used for communication among the devices in the IoT system. For example, in a traditional IoT system, the IoT devices may be manually configured for secured communications by an administrator (e.g., the home owner) via the web to participate in the IoT system. However, manual configuration requires human input. Additionally, IoT devices configured manually over the web requires additional complexities in hardware and extended configuration time (e.g., 10 seconds). Further, web configuration may require tracking a plurality of passwords (for each IoT devices) to avoid compromising the security of the IoT system. Therefore improvements in configuring IoT devices for secured communications may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

An aspect of the present disclosure includes a method including transmitting a token to a gateway, receiving a response token including an encrypted message, decrypting the encrypted message using a decryption key associated with the token to generate a decrypted message, validating content of the decrypted message, transmitting a certificate request in response to successfully validating the content of the decrypted message, receiving a certificate in response to the request, validating the certificate against a certification authority, and transmitting encrypted data via a secured connection in response to successfully validating the certificate.

Aspects of the present disclosure includes a system having a memory that stores instructions and a processor configured to execute the instructions to perform the steps of transmitting a token to a gateway, receiving a response token including an encrypted message, decrypting the encrypted message using a decryption key associated with the token to generate a decrypted message, validating content of the decrypted message, transmitting a certificate request in response to successfully validating the content of the decrypted message, receiving a certificate in response to the request, validating the certificate against a certification authority, and transmitting encrypted data via a secured connection in response to successfully validating the certificate.

Certain aspects of the present disclosure includes a non-transitory computer readable medium having instructions stored therein that, when executed by a processor, cause the processor to perform the steps of transmitting a token to a gateway, receiving a response token including an encrypted message, decrypting the encrypted message using a decryption key associated with the token to generate a decrypted message, validating content of the decrypted message, transmitting a certificate request in response to successfully validating the content of the decrypted message, receiving a certificate in response to the request, validating the certificate against a certification authority, and transmitting encrypted data via a secured connection in response to successfully validating the certificate.

Aspects of the present disclosure include methods, systems, and non-transitory computer readable media that perform the steps of receiving a token from a device, encrypting a portion of the token using an encryption key derived from the token, transmitting a response token including the encrypted message, receiving a certificate request, transmitting a certificate in response to the request, and receiving encrypted data via a secured connection.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

In some aspects of the present disclosure, an Internet of Things (IoT) device may be configured automatically (without human interaction/input) for establishing a secured connection between the IoT device and an IoT gateway. The secured connection may be established during the initial configuration of the IoT device. In some instances, the IoT device may broadcast one or more tokens. The IoT gateway may receive one of the one or more tokens broadcasted by the IoT device, and transmit a token response to the IoT device. The token response may include an encrypted message encrypted by the gateway using an encryption key associated with the received token. After the IoT device validates the token response from the IoT gateway, the IoT device may request a certificate from the IoT gateway. The IoT gateway may transmit the certificate to the IoT device. After receiving and validating the certificate, the IoT device may transmit encrypted data to the IoT gateway via the secured connection.

One aspect of the present disclosure may obviate the need for the IoT device to function as the certificate server during the configuration process. This configuration method of the present disclosure may decrease the configuration time for individual IoT devices, and as a result, decrease the configuration time for a large number (e.g., 50) of IoT devices.

Figure 1:
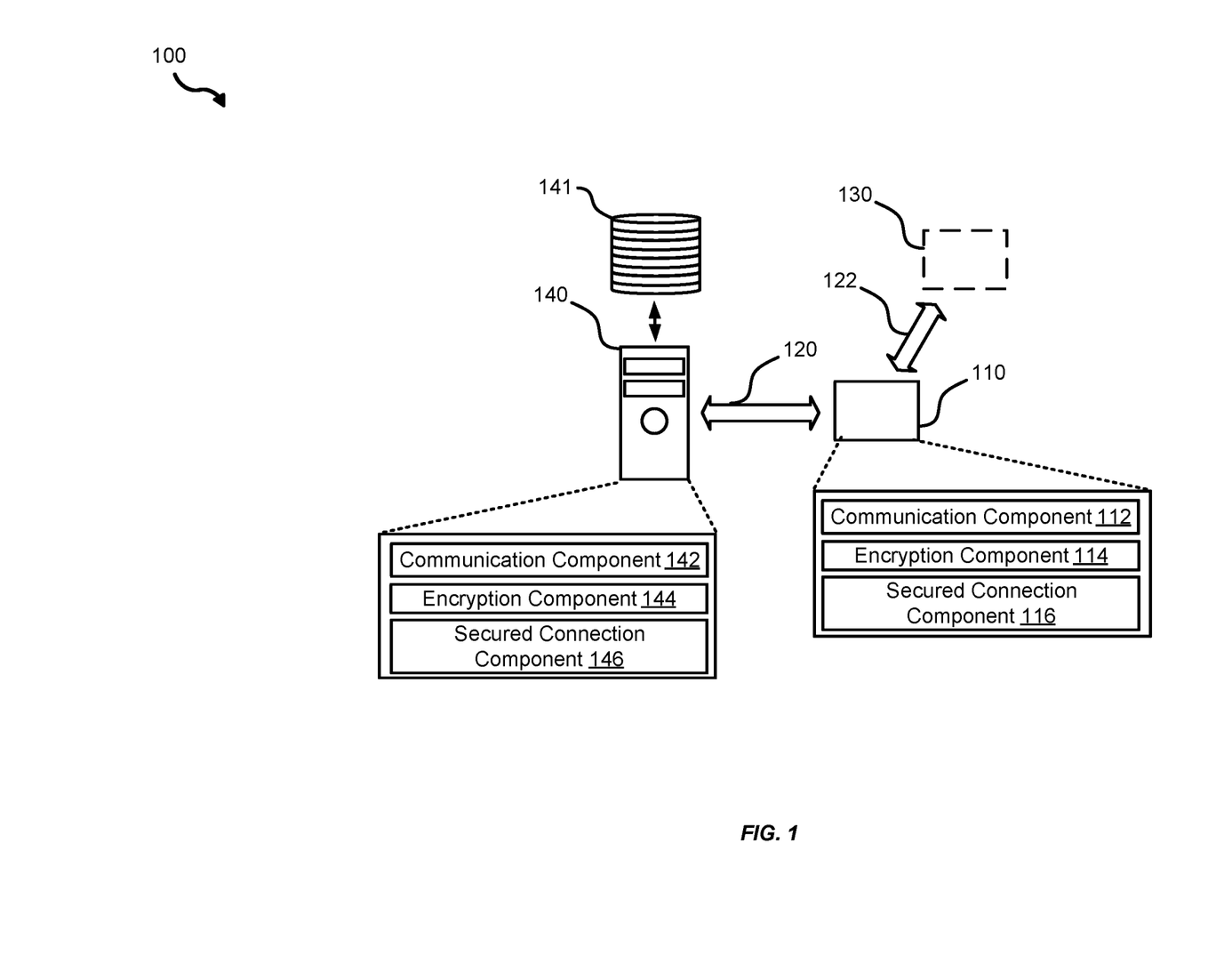
FIG. 1 illustrates an example of an environment for configuring an Internet of Things (IoT) device in accordance with aspects of the present disclosure.

Referring to FIG. 1, in a non-limiting implementation, an example of an environment 100 for configuring an IoT device 110 to establish a secured connection 120 with an IoT gateway 140. The environment 100 may optionally include an IoT component 130, such as a sensor, an actuator, a detector, and/or controller. The IoT device 110 may communicate with the IoT component 130 via a wired or wireless communication link 122. The IoT device 110 may include a communication component 112 that transmits and/or receives data to and/or from the IoT gateway 140 and/or the IoT component 130. The IoT device 110 may include an encryption component 114 that encrypts data and/or decrypts encrypted data. The IoT device 110 may include a secured connection component 116 that generates a certificate request and/or authenticates a certificate.

In some instances, the environment 100 may include the IoT gateway 140 and an optional data repository 141. The IoT gateway 140 may include a communication component 142 that sends and/or receives data to/from the IoT device 110. The IoT gateway 140 may include an encryption component 144 that encrypts data and/or decrypts encrypted data. The IoT gateway 140 may include a secured connection component 146 that generates a certificate.

During the normal operation, as illustrated in FIG. 1, in some instances, the IoT device 110 may broadcast one or more tokens. The IoT gateway 140 may receive one of the one or more tokens broadcasted by the IoT device 110. In response to receiving one of the one or more tokens, the IoT gateway 140 may transmit a token response to the IoT device 110. The token response may include an encrypted message encrypted by the IoT gateway 140 using an encryption key (explained in detail below) associated with the received token. After the IoT device 110 validates the token response from the IoT gateway 140, the IoT device 110 may request a certificate from the IoT gateway 140. The IoT gateway 140 may transmit the certificate (stored internally in the IoT gateway 140) to the IoT device 110. After receiving and validating the certificate, the IoT device 110 may transmit encrypted data to the IoT gateway 140 via the secured connection 120.

Figure 2:
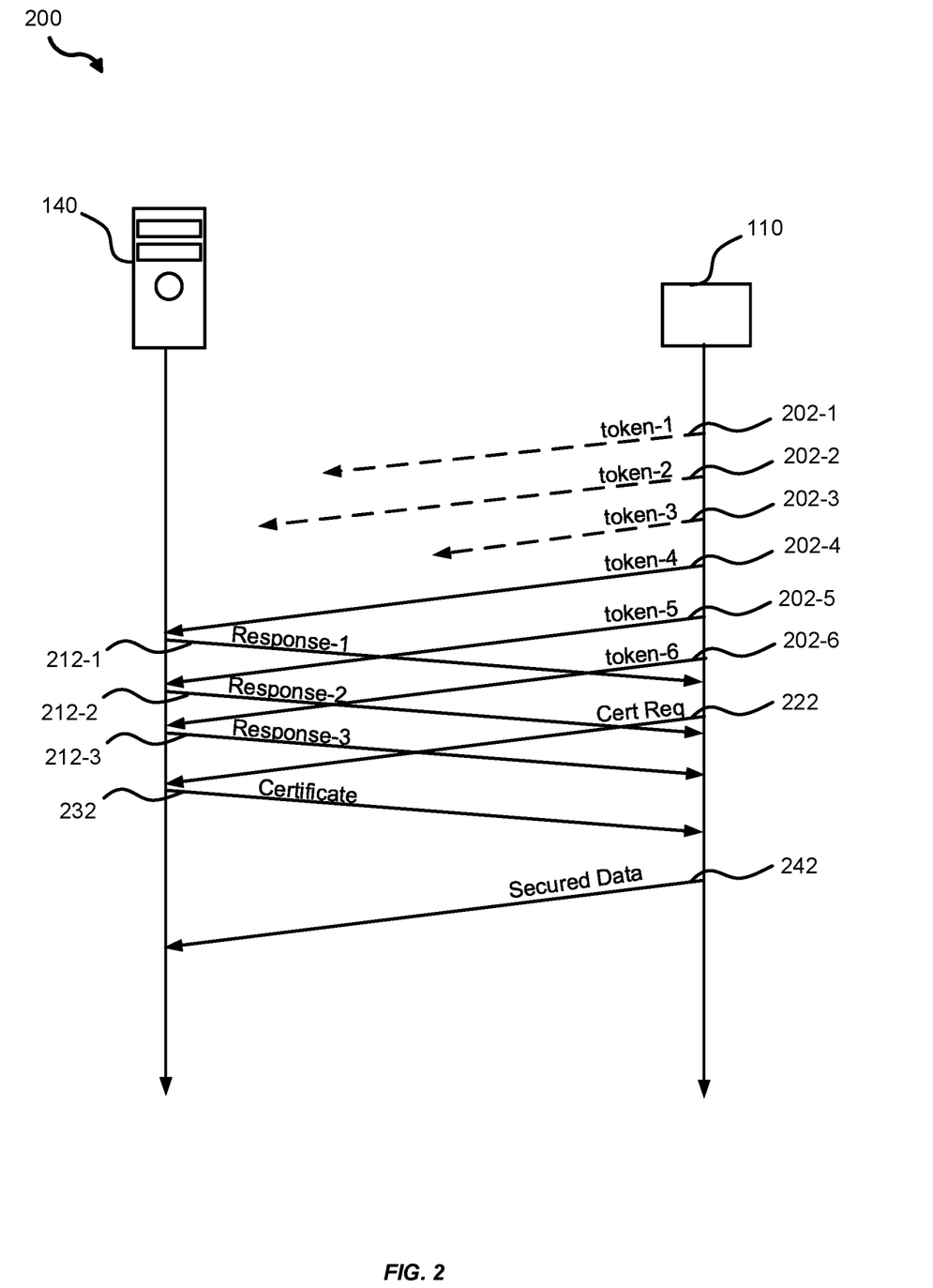
FIG. 2 illustrates an example of a method for configuring an IoT device in accordance with aspects of the present disclosure.

Turning to FIG. 2, in an implementation, the IoT device 110 may broadcast a first token 202-1, a second token 202-2, and a third token 202-3. The IoT device 110 may broadcast the tokens 202 to initialize the configuration process. The IoT gateway 140 may not successfully receive the first token 202-1, the second token 202-2, and the third token 202-3 (e.g., due to atmospheric interference, loss signals, etc.). The first token 202-1, the second token 202-2, and the third token 202-3 may include different information (e.g., different random numbers, described in further detail in FIG. 3 below). The IoT device 110 may transmit the first token 202-1, the second token 202-2, and the third token 202-3 at a predetermined interval (e.g., every 0.1 second, 0.2 second, 0.5 second, 1 second, 2 seconds, 5 seconds, or other suitable intervals).

In some implementations, the communication component 112 of IoT device 110 may transmit, via broadcast or unicast, a fourth token 202-4 at the predetermined interval after the third token 202-3. The IoT gateway 140 may successfully receive the fourth token 202-4. In response, the IoT gateway 140 may derive an encryption key based on the fourth token 202-4. In a non-limiting example, the encryption component 144 of the IoT gateway 140 may generate the encryption key based on a random number in the fourth token 202-4. The encryption component 144 of the IoT gateway 140 may generate the encryption key using a first hash function (stored internally). The encryption key may be a symmetric encryption key or an asymmetric encryption key (i.e., a public key). The encryption component 144 may encrypt a portion of characters (e.g., alpha-numeric, symbols, numbers, letters, etc.) in the fourth token 202-4 using the encryption key. The communication component 142 may generate a first response token 212-1 that includes the encrypted characters.

In certain examples, the communication component 142 of the IoT gateway 140 may transmit the first response token 212-1 to the IoT device 110. In response to receiving the first response token 212-1, the encryption component 114 of the IoT device 110 may attempt to decrypt the encrypted characters in the first response token 212-1 using one or more decryption keys (described below). For example, the encryption component 114 of the IoT device 110 may generate four decryption keys based on the random numbers (different) in the first token 202-1, the second token 202-2, the third token 202-3, and the fourth token 202-4. The encryption component 114 of the IoT device 110 may successfully decrypt the encrypted characters using the decryption key generated using the random number in the fourth token 202-4. A successful decryption may mean that the decrypted characters match the portion of characters in the fourth token 202-4. The decryption key generated using the random number in the fourth token 202-4 may properly decrypt the encrypted characters because the encrypted characters were encrypted using the encryption key generated using the random number in the fourth token 202-4. The decryption key may be generated using a second hash function (same or different from the first hash function). The decryption key may be a symmetric decryption key (identical to the symmetric encryption key) or an asymmetric decryption key (e.g., a private key).

In some examples, a successful decryption may indicate that the first response token 212-1 is a valid response token. In response to validating the first response token 212-1, the secured connection component 116 may generate a certificate request 222. The IoT device 110 may extract the Internet Protocol (IP) address of the IoT gateway from IP layer of the first response token 212-1.

In some implementations, the communication component 112 of the IoT device 110 may transmit the certificate request 222 to the IoT gateway 140 using the extracted IP address.

In an example, in response to receiving the certificate request 222, the communication component 142 of the IoT gateway 140 may transmit a certificate 232 to the IoT device 110. The certificate 232 may be a Transport Layer Security (TLS) certificate or a Secure Sockets Layer (SSL) certificate. Other certificates may also be transmitted.

In some implementations, the secured connection component 116 of the IoT device 110 may validate the certificate. For example, the secured connection component 116 may validate the certificate against an internal certificate authority (not shown). The certificate authority may include information indicating that the IoT gateway 140 is a verified issuer of digital certificate. Other means of validating the certificate may also be used. In optional implementations, the IoT gateway 140 and the IoT device 110 may engage in a secured connection "handshake" operation, including exchanging messages to acknowledge each other, verifying each other, establishing the encryption algorithms they will use, and agreeing on session keys. The secured connection handshake may establish the secured connection 120 between the IoT gateway 140 and the IoT device 110.

In certain non-limiting examples, the communication component 112 of the IoT device 110 may transmit secured data 242 to the IoT gateway 140.

In some instances, the IoT device 110 may continue to transmit tokens, such as a fifth token 202-5 and a sixth token 202-6, at the predetermined interval until receiving the first response 212-1. The IoT gateway 140 may generate responses to the fifth token 202-5 and the sixth token 202-6, such as a second response 212-2 and a third response 212-3, respectively. The IoT gateway 140 may transmit the second response 212-2 and the third response 212-3 to the IoT device 110.

In certain examples, after the IoT device 110 receives the first response 212-1 and successfully validates the first response 212-1, the IoT device 110 may stop transmitting tokens. If the IoT device 110 fails to validate the first response 212-1 (e.g., the response is received after a predetermined threshold time, the decrypted characters of the response do not match the portion of characters in the fourth token 202-4, etc.), the IoT device 110 may continue to send tokens (not shown).

In a non-limiting example, if the IoT device 110 fails to validate the certificate, the IoT device 110 may continue to transmit tokens.

In certain examples, after the IoT device 110 receives the first response 212-1 and successfully validates the first response 212-1, the IoT device 110 may ignore responses receive after the first response 212-1 (e.g., the second response 212-2 and the third response 212-3).

Figure 3:
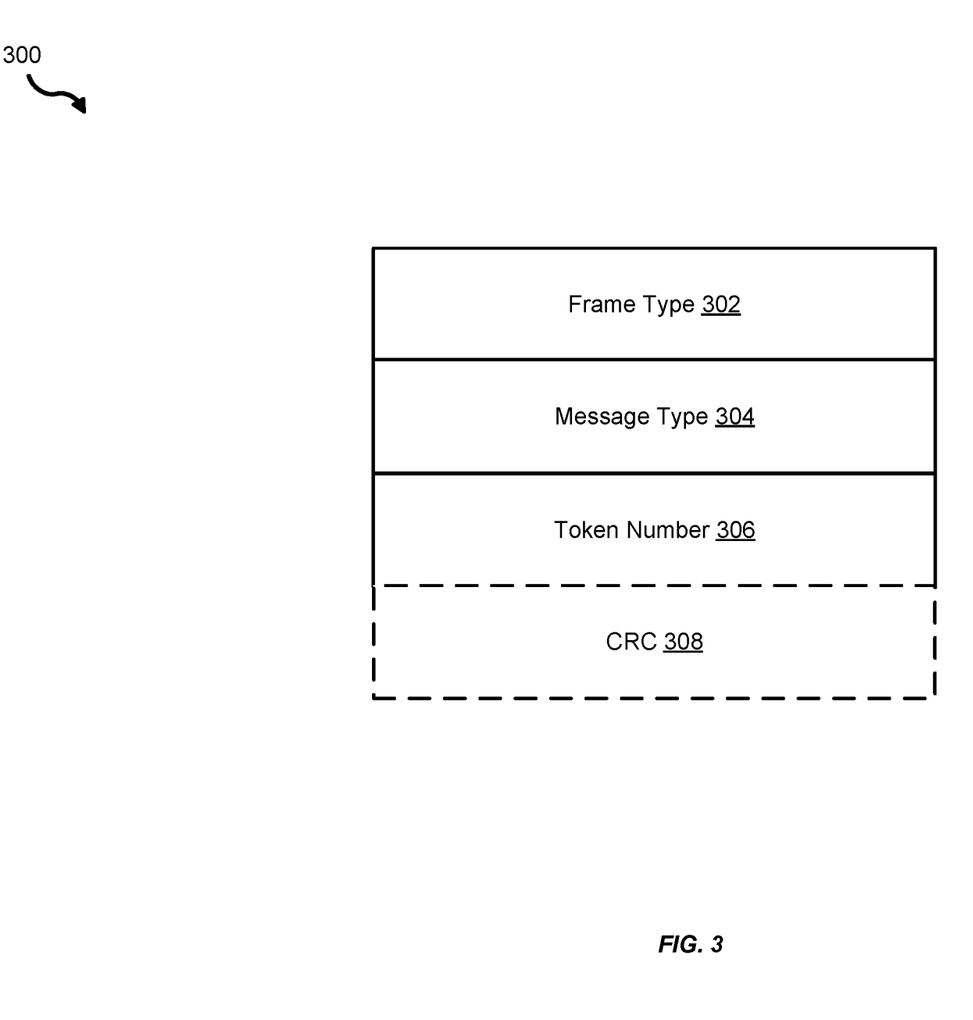
FIG. 3 illustrates an example of a token frame in accordance with aspects of the present disclosure.

Turning to FIG. 3, an example of a token frame 300 of a token, such as the fourth token 202-4, transmitted by the IoT device 110 may include a frame type 302 field used to validate the nature of the token frame 300 for different IoT device hardware models. The frame type 302 may be a 32-bit number. The token frame 300 may include a message type 304 field. The message type 304 may identify the type of message of the token frame 300. The message type 304 may be a 32-bit number. The token frame 300 may include a token number 306 field. The token number 306 may be a 32-bit random number of pseudo-random number. In other implementations, the token number 306 may be a 16-bit, a 64-bit, a 128-bit, or a 256-bit random/pseudo-random number. The token number 306 fields for the first token 202-1, the second token 202-2, the third token 202-3, and the fourth token 202-4 may be different (random or pseudo-random numbers generated for each token). The token number 306 may be used by the IoT gateway 140 (if received) to generate an encryption key. The token number 306 may be used by the IoT device 110 to generate a decryption key. The token frame 300 may include an optional cyclic redundancy check (CRC) 308 field. The CRC 308 may be a 32-bit number calculated over the token frame 300. The CRC 308 may be omitted if User Datagram Protocol (UDP) is enabled with a checksum. In alternative implementations, some or all of the frame type 302, the message type 304, the token number 306, and/or the CRC 308 may be 8-bit, 16-bit, 32-bit, 64-bit, 128-bit, 256-bit, or other numbers of bits.

Figure 4:
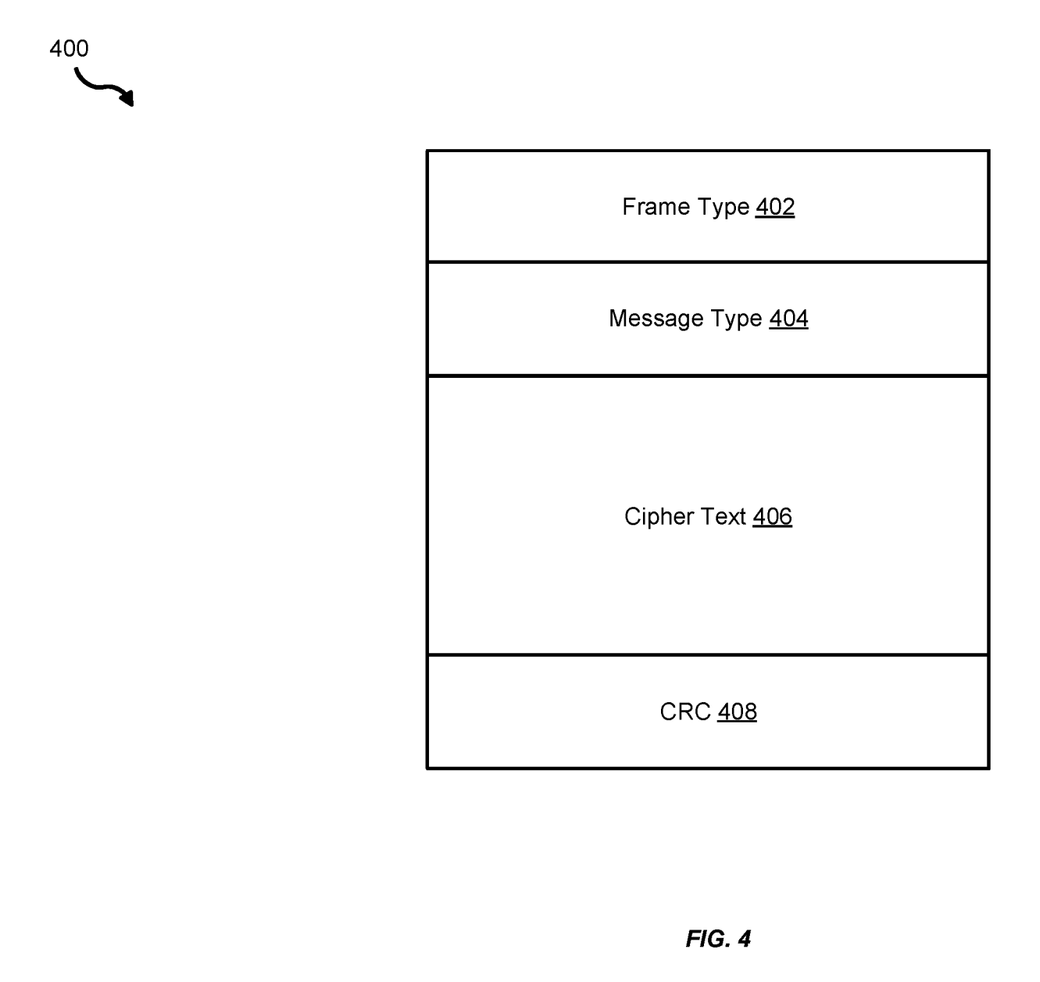
FIG. 4 illustrates an example of a token response frame in accordance with aspects of the present disclosure.

Turning to FIG. 4, an example of a response frame 400 of a response token, such as the first response token 212-1, transmitted by the IoT device 110 may include a frame type 402 field used to validate the nature of the response frame 400 for different IoT device hardware models. The frame type 402 may be a 32-bit number. The response frame 400 may include a message type 404 field. The message type 404 may identify the type of message of the response frame 400. The message type 404 may be a 32-bit number. The response frame 400 may include a cipher text 406 field. The cipher text 406 may include the encrypted characters. The cipher text 406 may be 128-bit, 256-bit, or longer. The response frame 400 may include an optional cyclic redundancy check (CRC) 408 field. The CRC 408 may be a 32-bit number calculated over the response frame 400. The CRC 408 may be omitted if User Datagram Protocol (UDP) is enabled with a checksum. In alternative implementations, some or all of the frame type 402, the message type 404, the cipher text 406, and/or the CRC 408 may be 8-bit, 16-bit, 32-bit, 64-bit, 128-bit, 256-bit, or other numbers of bits.

In certain aspects of the present disclosure, the random token, such as the token number 306, may be used by both the IoT gateway 140 and the IoT device 110 to derive the encryption/decryption key. The algorithm for key derivation may be the same for the IoT gateway 140 and the IoT device 110 for each token. Examples of the algorithm for key derivation may include a hash function, such as MD5 hashing. For the encryption/decryption operation, the IoT gateway 140 and the IoT device 110 may utilize the same cipher for each token. Examples of a cipher for encryption and/or decryption may include AES128 ECB. Other hash functions and/or ciphers may also be used.

Figure 5:
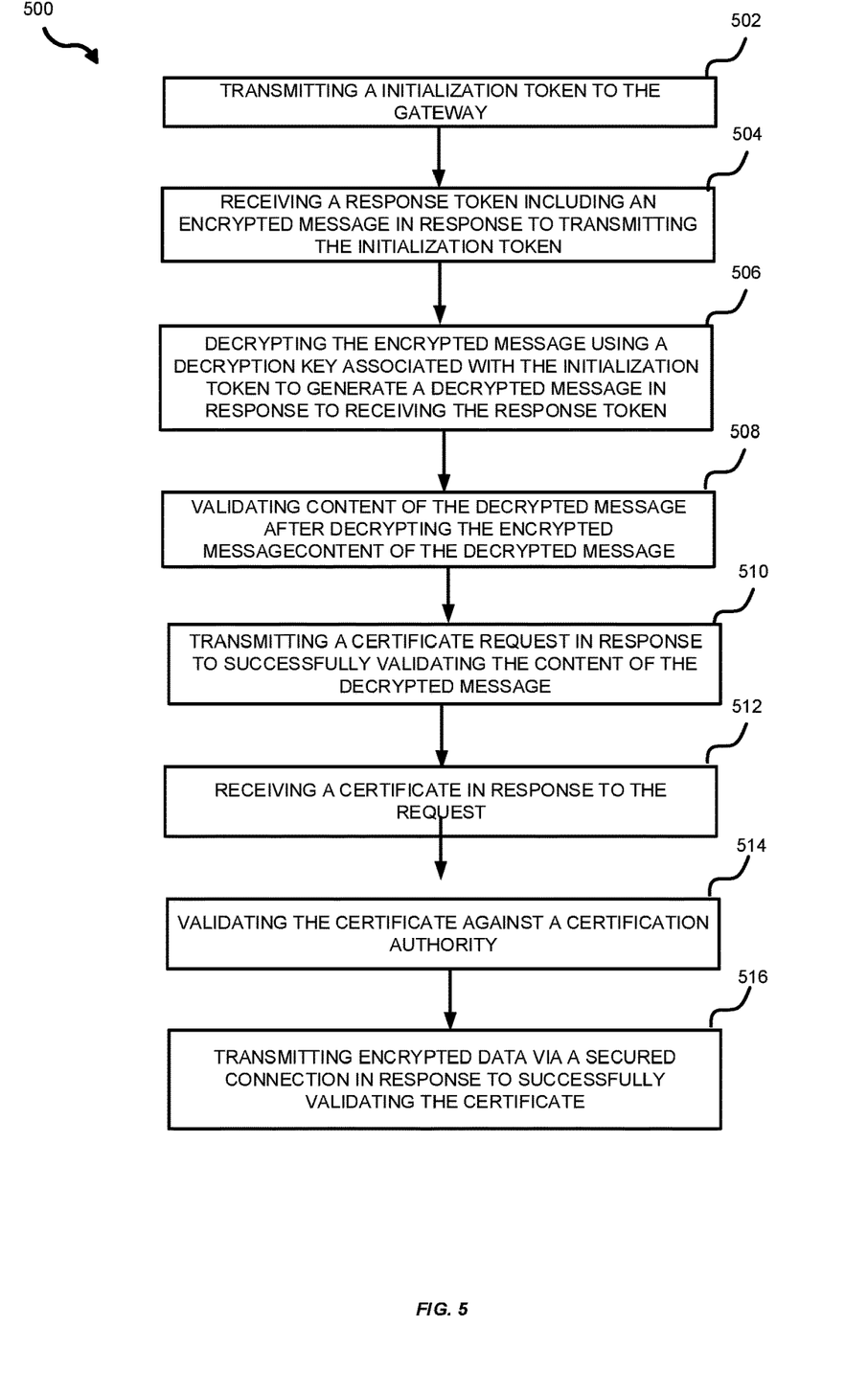
FIG. 5 illustrates an example of a method for establishing a secured connection by an IoT device in accordance with aspects of the present disclosure.

Turning to FIG. 5, an example of a method 500 for establishing a secured connection by an IoT device may be performed by the IoT device 110 and/or one or more of the communication component 112, the encryption component 114, and/or the secured connection component 116.

At block 502, the method 500 may transmit an initialization token to the gateway. For example, the communication component 112 of the IoT device 110 may transmit the fourth token 212-4 to the IoT gateway 110.

At block 504, the method 500 may receive a response token including an encrypted message in response to transmitting the initialization token. For example, the communication component 112 of the IoT device 110 may receive the first response token 212-1 that includes the encrypted characters.

At block 506, the method 500 may decrypt the encrypted message using a decryption key associated with the initialization token to generate a decrypted message in response to receiving the response token. For example, the encryption component 114 of the IoT device 110 may decrypt the encrypted characters using a decryption key generated from the token number 306 to generate decrypted characters.

At block 508, the method 500 may validate content of the decrypted message after decrypting the encrypted message. For example, the encryption component 114 of the IoT device 110 may validate the decrypted characters by comparing the decrypted characters with the portion of characters in the fourth token 202-4. If the decrypted characters match the portion of characters in the fourth token 202-4, then the decrypted characters are validated. If the decrypted characters do not match the portion of the characters in the fourth token 202-4, the IoT device 110 may continue to transmit tokens.

At block 510, the method 500 may transmit a certificate request in response to successfully validating the content of the decrypted message. For example, the communication component 112 of the IoT device 110 may transmit a certificate request in response to successfully validating the decrypted characters.

At block 512, the method 500 may receive a certificate in response to the request. For example, the communication component 112 of the IoT device 110 may receive a certificate, such as a TLS certificate or a SSL certificate, in response to the request.

At block 514, the method 500 may validate the certificate against a certification authority. For example, the secured connection component 116 of the IoT device 110 may validate the certificate against a certification authority.

At block 516, the method 500 may transmit secured data to the gateway via a secured connection in response to successfully validating the certificate. For example, the communication component 112 may transmit secured data via the secured connection 120 in response to successfully validating the certificate.

Figure 6:
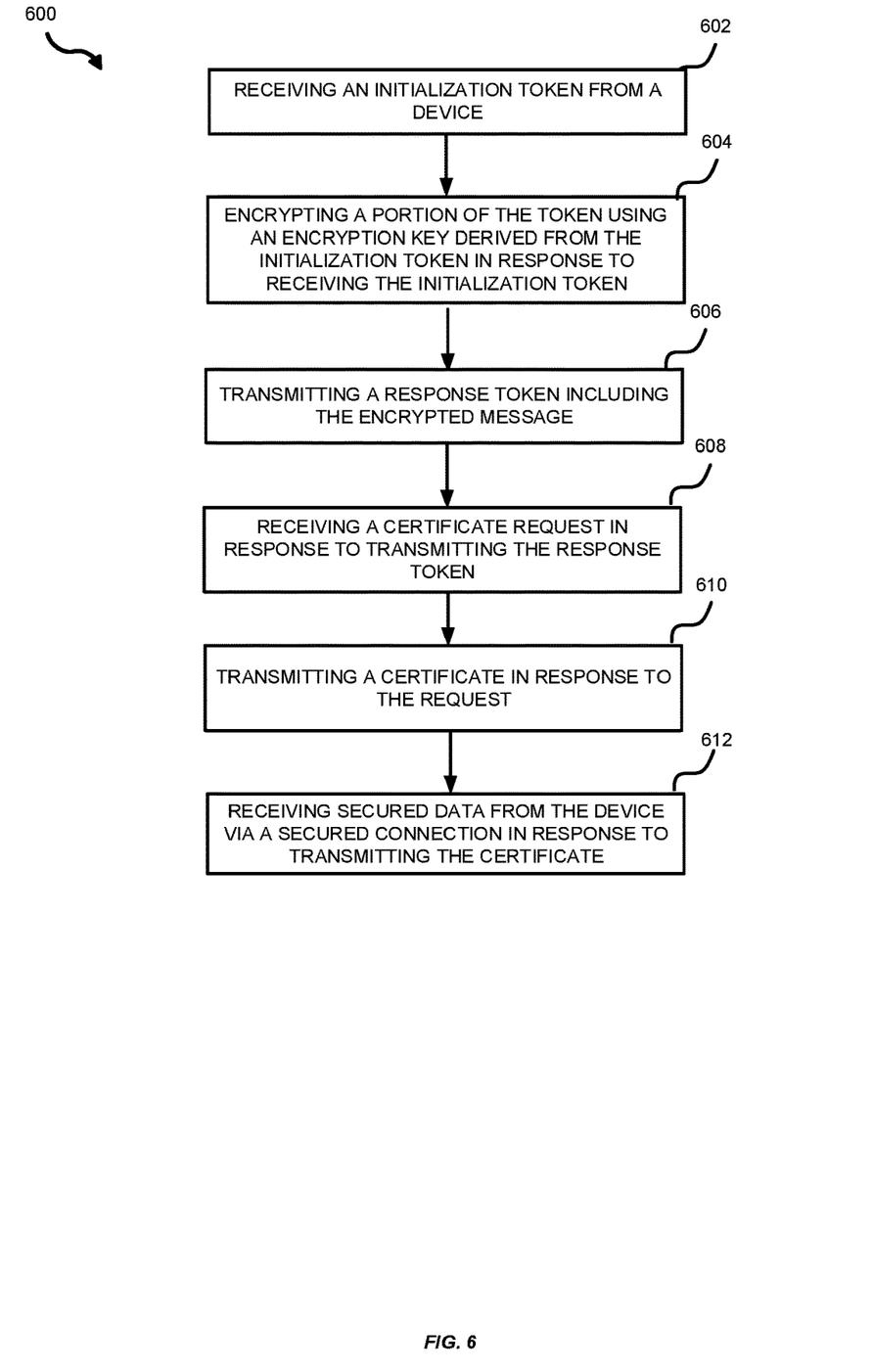
FIG. 6 illustrates an example of a method for establishing a secured connection by a gateway in accordance with aspects of the present disclosure.

Turning to FIG. 6, an example of a method 600 for establishing a secured connection by a gateway may be performed by the IoT gateway 140 and/or one or more of the communication component 142, the encryption component 144, and/or the secured connection component 146.

At block 602, the method 600 may receive an initialization token from a device. For example, the communication component 142 of the IoT gateway 140 may receive the fourth token 202-4 from the IoT device 110.

At block 604, the method 600 may encrypt a portion of the token using an encryption key derived from the initialization token in response to receiving the initialization token. For example, the encryption component 144 of the IoT gateway 140 may encrypt the portion of characters of the fourth token 202-4 using an encryption key derived from the token number 306.

At block 606, the method may transmit a response token including the encrypted message. For example, the communication component 142 of the IoT gateway 140 may transmit the first response token 212-1 including the encrypted characters.

At block 608, the method 600 may receive a certificate request in response to transmitting the response token. For example, the communication component 142 of the IoT gateway 140 may receive a certificate request.

At block 610, the method may transmit a certificate in response to the request. For example, the communication component 142 of the IoT gateway 140 may transmit a TLS certificate or a SSL certificate in response to the request.

At block 612, the method 600 may receive secured data from the device via a secured connection in response to transmitting the certificate. For example, the communication component 142 of the IoT gateway 140 may receive encrypted data from the IoT device 110 via the secured connection 120.

Figure 7:
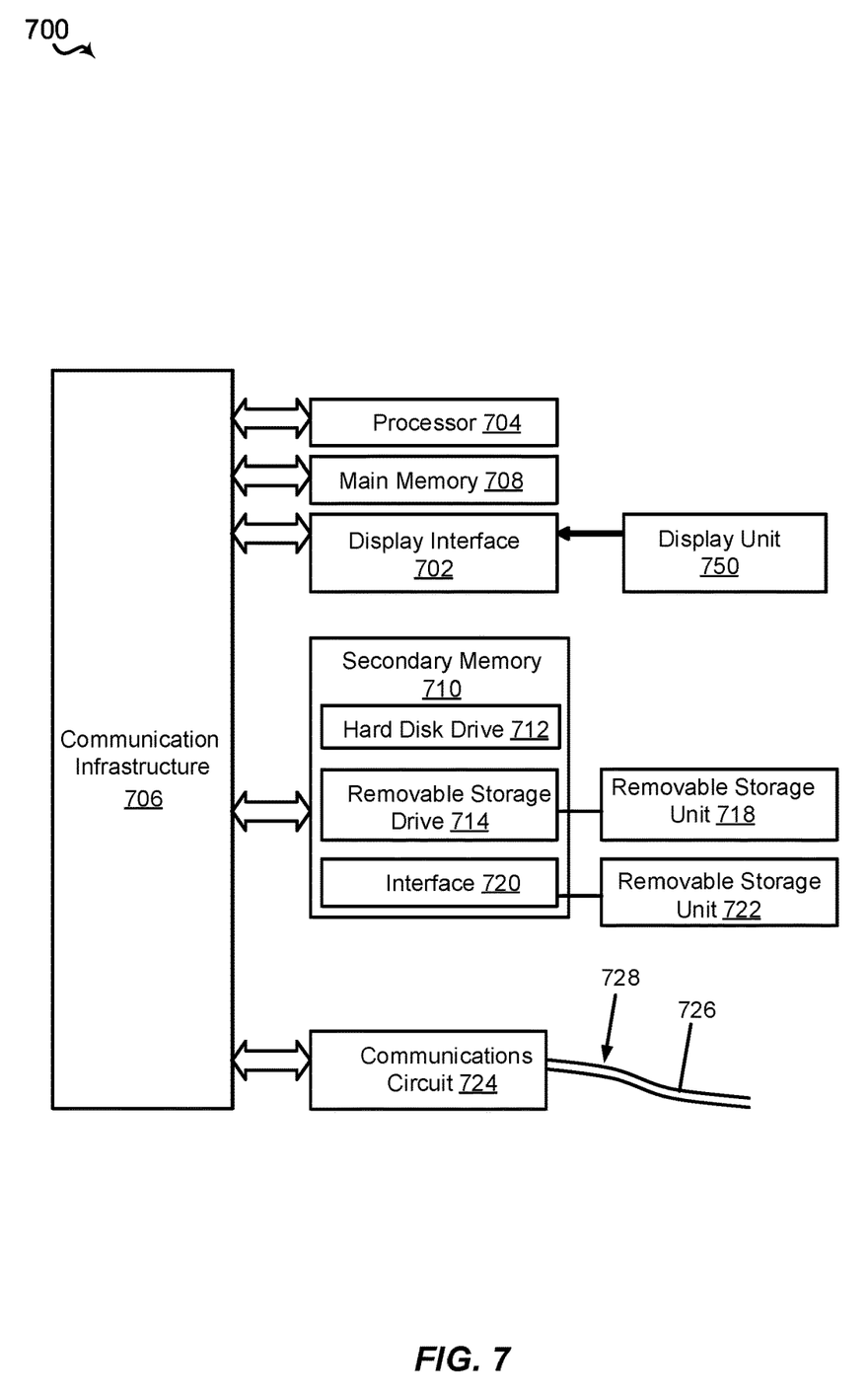
FIG. 7 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 700 is shown in FIG. 7. In some examples, the IoT gateway 140 and/or the IoT device 110 may be implemented as the computer system 700 shown in FIG. 7. The IoT gateway 140 and/or the IoT device 110 may include some or all of the components of the computer system 700.

The computer system 700 includes one or more processors, such as processor 704. The processor 704 is connected with a communication infrastructure 706 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 700 may include a display interface 702 that forwards graphics, text, and other data from the communication infrastructure 706 (or from a frame buffer not shown) for display on a display unit 750. Computer system 700 also includes a main memory 708, preferably random access memory (RAM), and may also include a secondary memory 710. The secondary memory 710 may include, for example, a hard disk drive 712, and/or a removable storage drive 714, representing a floppy disk drive, a magnetic tape drive, an optical disk drive, a universal serial bus (USB) flash drive, etc. The removable storage drive 714 reads from and/or writes to a removable storage unit 718 in a well-known manner. Removable storage unit 718 represents a floppy disk, magnetic tape, optical disk, USB flash drive etc., which is read by and written to removable storage drive 714. As will be appreciated, the removable storage unit 718 includes a computer usable storage medium having stored therein computer software and/or data. In some examples, one or more of the main memory 708, the secondary memory 710, the removable storage unit 718, and/or the removable storage unit 722 may be a non-transitory memory.

Alternative aspects of the present disclosures may include secondary memory 710 and may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications circuit 724. The communications circuit 724 may allow software and data to be transferred between computer system 700 and external devices. Examples of the communications circuit 724 may include a modem, a network interface (such as an Ethernet card), a communications port, a Personal Computer Memory Card International Association (PCMCIA) slot and card, etc. Software and data transferred via the communications circuit 724 are in the form of signals 728, which may be electronic, electromagnetic, optical or other signals capable of being received by the communications circuit 724. These signals 728 are provided to the communications circuit 724 via a communications path (e.g., channel) 726. This path 726 carries signals 728 and may be implemented using wire or cable, fiber optics, a telephone line, a cellular link, an RF link and/or other communications channels. In this document, the terms "computer program medium" and "computer usable medium" are used to refer generally to media such as the removable storage unit 718, a hard disk installed in hard disk drive 712, and signals 728. These computer program products provide software to the computer system 700. Aspects of the present disclosures are directed to such computer program products.

Computer programs (also referred to as computer control logic) are stored in main memory 708 and/or secondary memory 710. Computer programs may also be received via communications circuit 724. Such computer programs, when executed, enable the computer system 700 to perform the features in accordance with aspects of the present disclosures, as discussed herein. In particular, the computer programs, when executed, enable the processor 704 to perform the features in accordance with aspects of the present disclosures. Accordingly, such computer programs represent controllers of the computer system 700.

In an aspect of the present disclosures where the method is implemented using software, the software may be stored in a computer program product and loaded into computer system 700 using removable storage drive 714, hard drive 712, or communications interface 720. The control logic (software), when executed by the processor 704, causes the processor 704 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of establishing a secured connection between an Internet of Things (IoT) device and a gateway, comprising:

transmitting, from the IoT device, a first plurality of tokens that the gateway failed to respond to;

transmitting, from the IoT device, an initialization token to the gateway;

receiving, at the IoT device, a response token including an encrypted message in response to transmitting the initialization token;

decrypting, at the IoT device, the encrypted message using a decryption key associated with the initialization token to generate a decrypted message in response to receiving the response token;

validating, at the IoT device, content of the decrypted message after decrypting the encrypted message;

transmitting, from the IoT device, a certificate request in response to successfully validating the content of the decrypted message;

receiving, at the IoT device, a certificate in response to the request;

validating, at the IoT device, the certificate against a certification authority; and transmitting, from the IoT device, encrypted data via a secured connection in response to successfully validating the certificate.

2. The method of claim 1, further comprising, after transmitting the token, continuously transmitting, from the IoT device, a second plurality of tokens at a predetermined interval until validating the content of the decrypted message.

3. The method of claim 1, further comprising, after validating the content of the decrypted message, ignoring, at the IoT device, a plurality of response tokens.

4. The method of claim 1, further comprising establishing, at the IoT device, the secured connection with the gateway after validating the content of the decrypted message.

5. The method of claim 4, wherein the secured connection is a Transport Layer Security (TLS) connection.

6. The method of claim 1, wherein decrypting the encrypted message comprises generating, at the IoT device, a decryption key based on a token number, wherein the token number is a random number or a pseudo-random number.

7. An Internet of Things (IoT) device, comprising:

memory for storing instructions; and a processor coupled to the memory and configured to execute the instructions to:

transmit, from the IoT device, a first plurality of tokens that the gateway failed to respond to;

transmit, from the IoT device, an initialization token to the gateway;

receive, at the IoT device, a response token including an encrypted message in response to transmitting the initialization token;

decrypt, at the IoT device, the encrypted message using a decryption key associated with the initialization token to generate a decrypted message in response to receiving the response token;

validate, at the IoT device, content of the decrypted message after decrypting the encrypted message;

transmit, from the IoT device, a certificate request in response to successfully validating the content of the decrypted message;

receive, at the IoT device, a certificate in response to the request;

validate, at the IoT device, the certificate against a certification authority; and transmit, from the IoT device, encrypted data via a secured connection in response to successfully validating the certificate.

8. The IoT device of claim 7, wherein the processor is further configured to, after transmitting the token, continuously transmit, from the IoT device, a second plurality of tokens at a predetermined interval until validating the content of the decrypted message.

9. The IoT device of claim 7, wherein the processor is further configured to, after validating the content of the decrypted message, ignore, at the IoT device, a plurality of response tokens.

10. The IoT device of claim 7, wherein the processor is further configured to establish, at the IoT device, the secured connection with the gateway after validating the content of the decrypted message.

11. The IoT device of claim 10, wherein the secured connection is a Transport Layer Security (TLS) connection.

12. The IoT device of claim 7, wherein decrypting the encrypted message comprises generating, at the IoT device, a decryption key based on a token number, wherein the token number is a random number or a pseudo-random number.

13. A non-transitory computer readable medium comprising instructions stored therein that, when executed by a processor of an Internet of Things (IoT) device, cause the processor to:

transmit, from the IoT device, a first plurality of tokens that the gateway failed to respond to;

transmit, from the IoT device, an initialization token to the gateway;

receive, at the IoT device, a response token including an encrypted message in response to transmitting the initialization token;

decrypt, at the IoT device, the encrypted message using a decryption key associated with the initialization token to generate a decrypted message in response to receiving the response token;

validate, at the IoT device, content of the decrypted message after decrypting the encrypted message;

transmit, from the IoT device, a certificate request in response to successfully validating the content of the decrypted message;

receive, at the IoT device, a certificate in response to the request;

validate, at the IoT device, the certificate against a certification authority; and transmit, from the IoT device, encrypted data via a secured connection in response to successfully validating the certificate.

14. The non-transitory computer readable medium of claim 13, further comprising instructions that, when executed by the processor, cause the processor to, after transmitting the token, continuously transmit, from the IoT device, a second plurality of tokens at a predetermined interval until validating the content of the decrypted message.

15. The non-transitory computer readable medium of claim 13, further comprising instructions that, when executed by the processor, cause the processor to, after validating the content of the decrypted message, ignore, at the IoT device, a plurality of response tokens.

16. The non-transitory computer readable medium of claim 13, further comprising instructions that, when executed by the processor, cause the processor to establish, at the IoT device, the secured connection with the gateway after validating the content of the decrypted message.

17. The non-transitory computer readable medium of claim 13, wherein decrypting the encrypted message comprises generating, at the IoT device, a decryption key based on a token number, wherein the token number is a random number or a pseudo-random number.

* * * * *